May 17, 1938.    G. L. ALLEN, JR    2,117,931
MANUFACTURE OF NITROMETHANE
Filed March 29, 1937
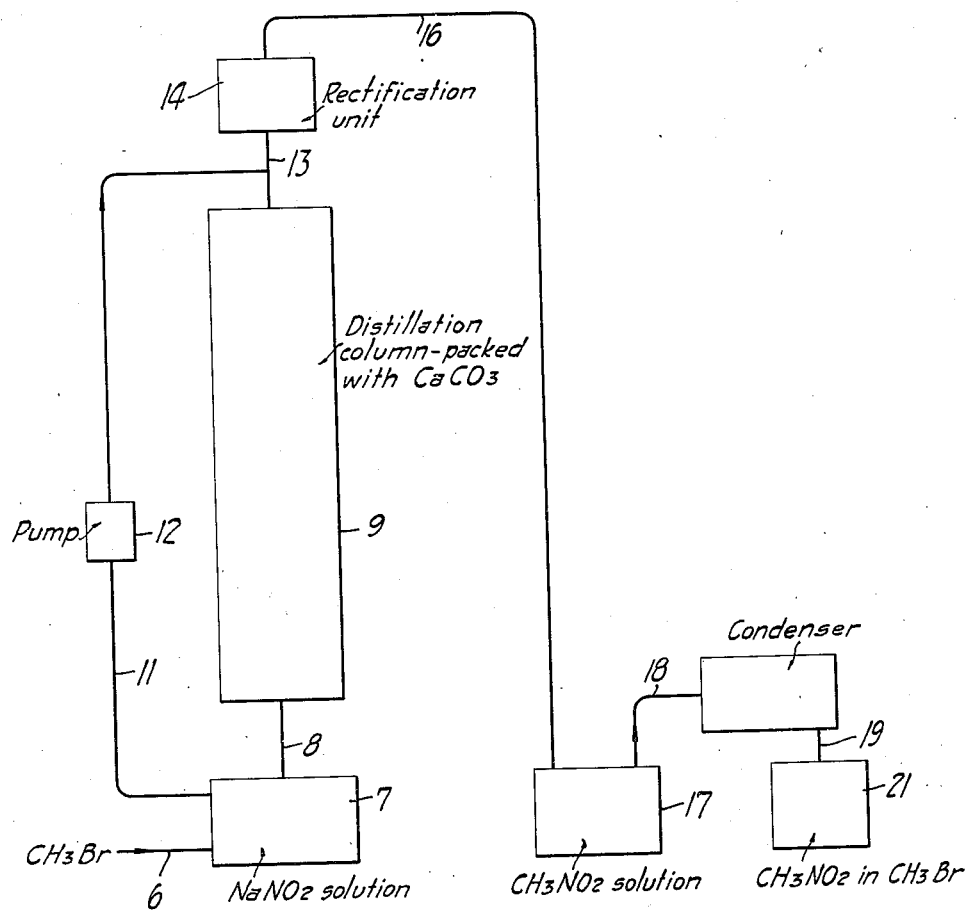
INVENTOR.
Glenn L. Allen Jr.
BY Robert H. Eckhoff
ATTORNEY.

Patented May 17, 1938

2,117,931

UNITED STATES PATENT OFFICE 2,117,931

MANUFACTURE OF NITROMETHANE

Glenn L. Allen, Jr., Antioch, Calif., assignor to Great Western Electro-Chemical Company, a corporation of California Application March 29, 1937, Serial No. 133,620

5 Claims. (Cl. 260—144)

This invention relates to the manufacture of nitrated organic compounds, particularly nitrated paraffines such as nitromethane.

Ramage has disclosed an excellent process for the manufacture of chlorpicrin by the chlorination of nitromethane under certain conditions—see Patent 1,996,388 of April 2, 1935. The present invention is concerned with the production of nitromethane for chlorination to the end that cheap chlorpicrin can be provided. In a prior application, Serial No. 46,270, filed October 23, 1935, Bender has disclosed the successful nitration of alkyl compounds containing less than six carbon atoms by the reaction of an alkali nitrite with the alkyl halide, and he particularly disclosed the reaction with the chloride. As typical of the net effects secured by the reaction of sodium nitrite with methyl chloride, for example, Bender provides the following reaction:—

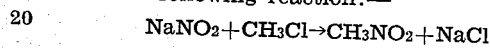

Bender states that this reaction does not represent an equilibrium condition and in fact is only a representation of the net result secured when these compounds are brought together. To quote Bender, "I have determined that reactions much more complex than this go on and that the above reaction is only one summarizing the net effect of several reactions". The foregoing statement I have confirmed, the other reactions which go on result in the formation of undesirable materials at the expense of nitromethane production. So far as the nitromethane is concerned, they can be considered as destructive decomposition or side reactions resulting in the formation of amines, ammonia and complex organic compounds.

I have discovered that by utilizing methyl bromide as the reacting halide, all other things being equal to those employed by Bender, I am able to secure seven times as good a yield of nitromethane as Bender secured using methyl chloride. This yield is unexpected. Since methyl bromide is a more reactive material than methyl chloride, one would not expect the proportion between the products formed to be substantially identical with that proportion existing for methyl chloride. Instead, unexpectedly enough, the proportion of the by-products to the nitromethane formed is no greater, while the rate of formation of nitromethane is much higher and in the identical apparatus used by Bender, under substantially the same operating conditions, seven times as much nitromethane is produced as Bender succeeded in securing in a given length of time.

In the drawing, the single figure provides a schematic showing of the apparatus employed for carrying on the process and the steps thereof.

In operation, I have fed methyl bromide in through line 6 into the boiler 7 wherein an aqueous solution of sodium nitrite is maintained. Products volatilized in the boiler pass through line 8 into the distillation column 9, wherein vapors and liquid were constantly contacted by suitable contacting means. To maintain the correct pH condition I successfully pack the tower with granular $CaCO_3$ as this acts not only as a contact medium but to maintain proper pH conditions, between 7.0 and 9.5, while the reaction is going on in the column. At the same time a portion of the liquid contents of boiler 7 was pumped through line 11 by pump 12 directly to the top of the distillation column into line 13 connecting the rectification unit 14 to the distillation column so that a constant reflux of concentrated sodium nitrite solution was supplied at the top of the distillation column for reaction. I have found this mode of operation advantageous, although reflux can be allowed to return through line 11 to boiler 7 as proposed by Bender. The comparisons between this process and the Bender process followed the mode of operation disclosed in the Bender case.

Vapors passing through the rectification unit are conducted by line 16 to vessel 17, wherein an aqueous solution of nitromethane collects. Vapors passing out of vessel 17 are conducted by line 18 through a brine condenser maintained at a temperature sufficient to condense the methyl bromide, about −15° C. Liquid condensate is passed through line 19 into vessel 21, wherein a solution of nitromethane and methyl bromide collects.

In one instance, I placed in the boiler 7, 1500 cc. of water containing 567 grams of sodium nitrite, a concentration of 37.7 grams per 100 cc. of water. This provides an excess concentration of sodium nitrite. To preserve the pH condition, as disclosed in the Bender application, I added 109 grams of calcium carbonate. Thus Bender has disclosed that the pH of the mixture in the boiler 7 should be kept between 6 and 10, when the pH is measured in the cold. 184 cc. of methyl bromide, 312 grams, were gradually added, while the mixture was boiled in the boiler 7. A total of 47.1 grams of nitromethane were recovered, a portion of the nitromethane being found in vessel 21, 3.9 grams. Of course, upon distillation of the nitromethane and the methyl bromide solution, the nitromethane was recovered.

The yield of nitromethane, based on the amount of methyl bromide used up in the reaction, was 62.7%. However, the rate of yield was seven times as fast as that secured by Bender for, comparing my results with Bender's, in the same length of time, I recovered seven times as much nitromethane as did Bender, using exactly the same equipment, while the yield remains the same even though methyl bromide is apparently a much faster reacting material.

I claim:

1. A process for the manufacture of nitromethane comprising reacting methyl bromide and an alkali nitrite at a pH between 6 and 10 to form nitromethane and the alkali bromide.

2. The improvement, in the manufacture of nitromethane by reacting a methyl monohalide and an alkali nitrite, which consists in employing methyl bromide as the methyl monohalide.

3. In a process of manufacturing nitromethane, distilling an alkali metal nitrite and methyl bromide over a mass of $CaCO_3$ granules.

4. In a process of manufacturing nitromethane, boiling a mixture of an alkali metal nitrite and methyl bromide, passing vapors from said boiling mixture into a distillation column, and passing liquid from said mixture in adjacent the top of said column.

5. In a process of manufacturing nitromethane, boiling a mixture of an alkali metal nitrite and methyl bromide, passing vapors from said boiling mixture into a distillation column packed with granular $CaCO_3$, and passing liquid from said mixture in adjacent the top of said column.

GLENN L. ALLEN, Jr.